United States Patent
Fujino et al.

(10) Patent No.: US 10,350,497 B2
(45) Date of Patent: Jul. 16, 2019

(54) INFORMATION PROCESSING APPARATUS, INFORMATION PROCESSING SYSTEM, COMPUTER-READABLE STORAGE MEDIUM, AND INFORMATION PROCESSING METHOD FOR DISPLAYING A DEGREE OF PROGRESS FOR A TASK

(75) Inventors: Yosuke Fujino, Kyoto (JP); Naoya Morimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 244 days.

(21) Appl. No.: 13/483,651

(22) Filed: May 30, 2012

(65) Prior Publication Data

US 2012/0306867 A1    Dec. 6, 2012

(30) Foreign Application Priority Data

May 31, 2011   (JP) .................................. 2011-122381

(51) Int. Cl.
*A63F 13/5378* (2014.01)
*A63F 13/00* (2014.01)
*A63F 13/77* (2014.01)

(52) U.S. Cl.
CPC .......... *A63F 13/5378* (2014.09); *A63F 13/00* (2013.01); *A63F 13/77* (2014.09); *A63F 2300/303* (2013.01)

(58) Field of Classification Search
CPC ...................................................... A63F 13/00
See application file for complete search history.

(56) References Cited

U.S. PATENT DOCUMENTS

| | | | |
|---|---|---|---|
| 6,585,519 B1* | 7/2003 | Jenkins et al. | 434/236 |
| 2001/0055017 A1* | 12/2001 | Ording | 345/440 |
| 2006/0168119 A1 | 7/2006 | Inoue et al. | |
| 2010/0056268 A1 | 3/2010 | Langan et al. | |
| 2010/0099473 A1 | 4/2010 | Ikejiri et al. | |

FOREIGN PATENT DOCUMENTS

| | | |
|---|---|---|
| JP | 01-250288 | 10/1989 |
| JP | 11-110178 | 4/1999 |
| JP | H 11347251 A | 12/1999 |
| WO | WO 2008/008038 A1 | 1/2008 |

OTHER PUBLICATIONS

Beijing 2008 Olympics (Aug. 16, 2008). Swimming—Men's 50M Freestyle Final—Beijing 2008 Summer Olympic Games [Video file]. Retrieved from http://www.youtube.com/watch?v=rxyMg-GtGgg.*

(Continued)

*Primary Examiner* — Zhengxi Liu
(74) *Attorney, Agent, or Firm* — Nixon & Vanderhye, P.C.

(57) ABSTRACT

When a data transfer process is started, a state in which a plurality of character objects lift an icon object in a three-dimensional virtual space, and carry the icon object from a start point toward a completion point in the three-dimensional virtual space, according to a degree of progress of the data transfer process, is displayed. At this time, a display range is sequentially shifted according to the degree of progress of the data transfer process so as to constantly display the icon object on a screen.

17 Claims, 17 Drawing Sheets

(56) References Cited

OTHER PUBLICATIONS

"Long Shot, Medium Shot, Close-Up", http://www.releasing.net/filmmaker/long_medium_close-up_shots.html, retrieved on Jun. 16, 2016 from http://web.archive.org/web/20041214112705/http://www.releasing.net/filmmaker/long_medium_close-up_shots.html, archived on Dec. 14, 2004.*

Eteszt, "Pretty Loaded", https://www.youtube.com/watch?v=99moh2t4PB8, published on Jul. 15, 2009.*

Nurminen, Antti, and Antti Oulasvirta. "Designing interactions for navigation in 3D mobile maps." Map-based mobile services (2008): 198-227.*

Unknown author, "Make a Quick Thermometer Chart to Compare Targets and Actuals", https://chandoo.org/wp/2009/12/17/quick-thermometer-chart/ posted on Dec. 17, 2009, archived at https://web.archive.org/web/20091220034416/https://chandoo.org/wp/2009/12/17/quick-thermometer-chart/ on Dec. 20, 2009.*

Pretty Loaded, [online], YouTube LLC, Jul. 15, 2009, URL: https://www.youtube.com/watch?v=99moh2t4PB8.

Office Action from Japanese Patent Application No. 2011-122381 dated Jul. 21, 2015.

Pretty Loaded: Artistic Pre-loader Collection, K'conf, Jan. 14, 2009, URL: http://kenz/0.s201.xrea.com/weblog/2009/01/pretty_loaded.html (with translation).

Animeishon ya Enshutsu no Benkyou ni, "Pretty Loaded," a collection of loaded sites, kore to are.jp, Jan. 15, 2009, URL: http://aretokore.jp/blog/2009/01/pretty_loaded.html.

* cited by examiner

F I G. 3
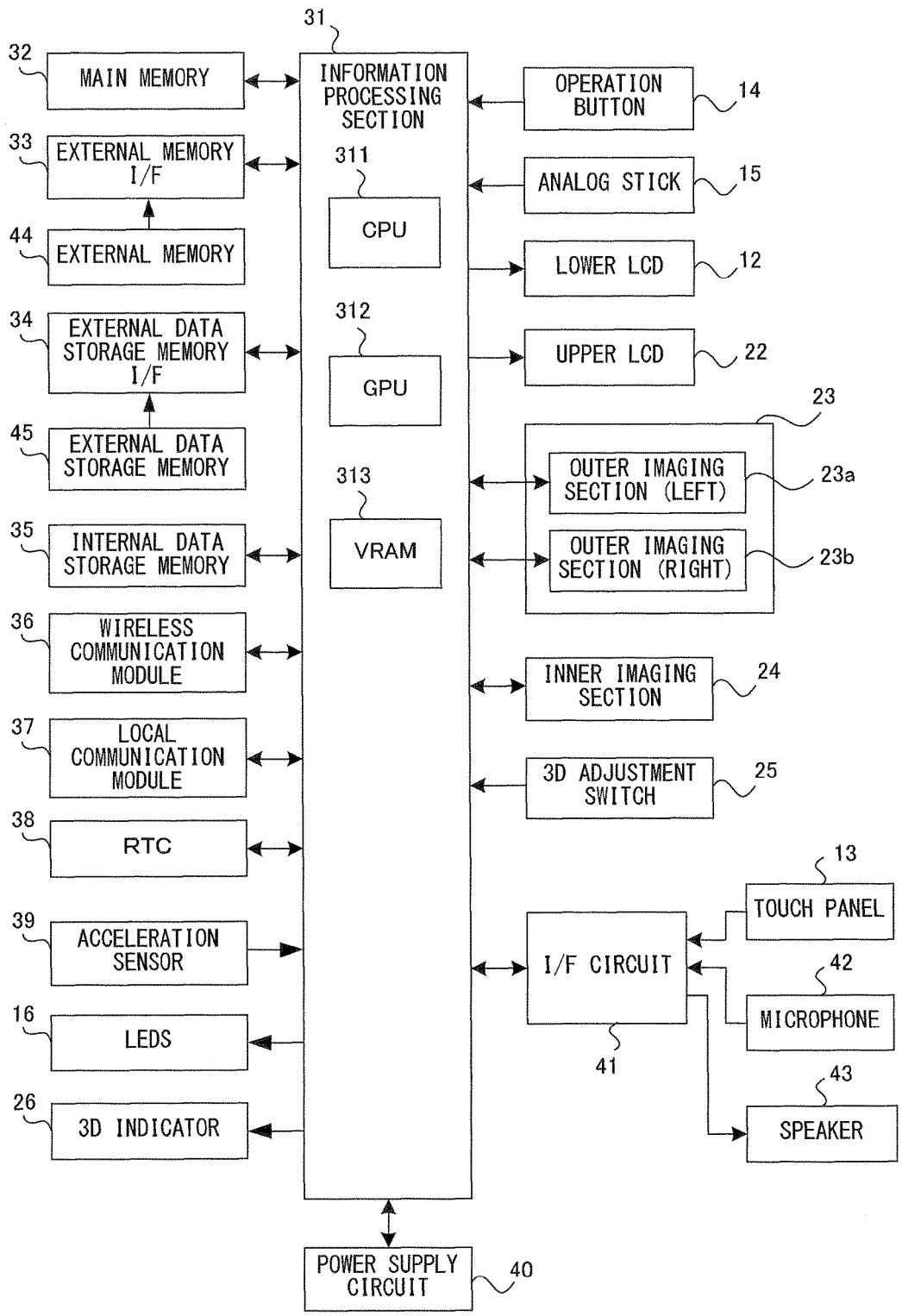

| DATA SIZE | DISTANCE FROM START POINT TO COMPLETION POINT |
|---|---|
| SMALL | S G <br> ←D1→ |
| MEDIUM | S 50 G <br> ←——D2——→ |
| LARGE | S 25 50 75 G <br> ←————D3————→ |

| DATA SIZE | ICON SIZE | THE NUMBER OF CHARACTERS |
|---|---|---|
| SMALL | SMALL | 4 |
| MEDIUM | MEDIUM | 6 |
| LARGE | LARGE | 8 |

F I G. 1 3
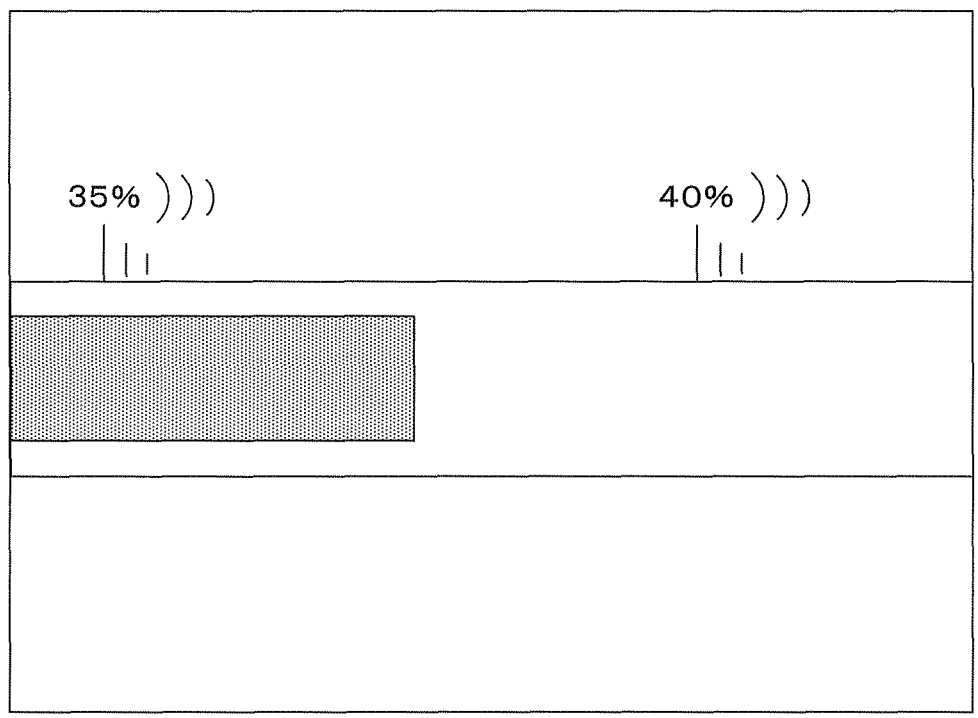

INFORMATION PROCESSING APPARATUS, INFORMATION PROCESSING SYSTEM, COMPUTER-READABLE STORAGE MEDIUM, AND INFORMATION PROCESSING METHOD FOR DISPLAYING A DEGREE OF PROGRESS FOR A TASK

CROSS REFERENCE TO RELATED APPLICATION

The disclosure of Japanese Patent Application No. 2011-122381, filed on May 31, 2011, is incorporated herein by reference.

FIELD

The technique described herein relates to an information processing apparatus, an information processing system, a computer-readable storage medium, and an information processing method, and particularly to an information processing apparatus, an information processing system, a computer-readable storage medium, and an information processing method capable of displaying a degree of progress of a predetermined information processing task.

BACKGROUND AND SUMMARY

Conventionally, display of a degree of progress has been performed in various manners in order to inform a user that data transmission or reception is being performed, and how much degree the data transmission or reception has progressed, in a case where, for example, the data transmission or data reception is performed among a plurality of information processing apparatuses.

For example, a conventional art in which a time required for data reception is calculated, and a color of a figure displayed on a monitor is changed with elapse of time for the data reception, has been known. Further, a conventional art in which a degree of progress of data reception is displayed by using a bar graph, and a conventional art in which a remaining time up to completion of data reception is indicated, have been also known.

However, these conventional arts have a drawback that a visual change is small and the display is monotonous.

Therefore, an object of the technique described herein is to make available an information processing apparatus, an information processing system, a computer-readable storage medium, and an information processing method capable of displaying a degree of progress of a predetermined information processing task in a novel display manner.

The aforementioned object is attained by, for example, the following features.

A first exemplary feature is directed to an information processing apparatus including at least one screen, and the information processing apparatus includes: an execution section configured to execute a predetermined information processing task; a display section configured to display, on the at least one screen, a portion of a progress degree display image representing a degree of progress of the predetermined information processing task; and a display controller configured to sequentially shift a display range of the progress degree display image to be displayed on the at least one screen, according to the degree of progress of the predetermined information processing task.

The progress degree display image may include a portion representing a most recent degree of progress, and the display controller may sequentially shift the display range of the progress degree display image so as to display, on the at least one screen, the portion which is included in the progress degree display image, and which represents the most recent degree of progress.

Further, the display controller may sequentially shift the display range of the progress degree display image so as to change from a first position in the progress degree display image toward a second position in the progress degree display image, and the first position represents a start point of the predetermined information processing task, and the second position represents a completion point of the predetermined information processing task.

Further, the display controller may change a distance from the first position to the second position according to the predetermined information processing task.

Further, the display controller may change a distance from the first position to the second position according to an amount of data to be processed in the predetermined information processing task.

Further, the display controller may change a distance from the first position to the second position according to a time required for the predetermined information processing task.

Further, the progress degree display image may include a position display located between the first position and the second position, and the position display represents the degree of progress between the first position and the second position.

Further, the position display may be located between the first position and the second position in the progress degree display image at predetermined intervals.

Further, when execution of the predetermined information processing task is started, the display controller may display an entirety of the progress degree display image on the at least one screen, and thereafter a portion of the progress degree display image may be enlarged and displayed on the at least one screen, and the display range of the progress degree display image may be then shifted sequentially according to the degree of progress of the predetermined information processing task.

Further, the progress degree display image may be an image representing a three-dimensional virtual space including a predetermined three-dimensional object. The display controller may move the three-dimensional object from a first point in the three-dimensional virtual space, toward a second point in the three-dimensional virtual space, according to the degree of progress of the predetermined information processing task, and the first point represents a start point of the predetermined information processing task, and the second point represents a completion point of the predetermined information processing task, and a virtual camera may be controlled so as to follow the three-dimensional object, so that the progress degree display image may be generated.

Further, the predetermined information processing task may include at least one of a data reception process, a data transmission process, a data writing process for writing data in a storage device, and a data reading process for reading data from the storage device.

Further, the progress degree display image may include a portion representing a most recent degree of progress, and the most recent degree of progress may be displayed by changing, in the progress degree display image, a relative position of the portion representing the most recent degree of progress, according to the degree of progress.

Further, the progress degree display image may include a portion representing a most recent degree of progress, the most recent degree of progress may be displayed by moving, in the progress degree display image, a display position of the portion representing the most recent degree of progress, according to the degree of progress, and the display controller may further display a predetermined character object on the at least one screen, and the display position of the portion representing the most recent degree of progress may be moved in the progress degree display image by using the predetermined character object.

A second exemplary feature is directed to an information processing system including at least one screen, and the information processing system includes: an execution section configured to execute a predetermined information processing task; a display section configured to display, on the at least one screen, a portion of a progress degree display image representing a degree of progress of the predetermined information processing task; and a display controller configured to sequentially shift a display range of the progress degree display image to be displayed on the at least one screen, according to the degree of progress of the predetermined information processing task.

A third exemplary feature is directed to a computer-readable storage medium having stored therein an information processing program that causes a computer of an information processing apparatus including at least one screen to function as: an execution section configured to execute a predetermined information processing task; a display section configured to display, on the at least one screen, a portion of a progress degree display image representing a degree of progress of the predetermined information processing task; and a display controller configured to sequentially shift a display range of the progress degree display image to be displayed on the at least one screen, according to the degree of progress of the predetermined information processing task.

A fourth exemplary feature is directed to an information processing method executed by an information processing apparatus including at least one screen, and the information processing method includes the steps of: executing a predetermined information processing task; displaying, on the at least one screen, a portion of a progress degree display image representing a degree of progress of the predetermined information processing task; and sequentially shifting a display range of the progress degree display image to be displayed on the at least one screen, according to the degree of progress of the predetermined information processing task.

According to the technique, a degree of progress of a predetermined information processing task can be displayed in a novel display manner.

These and other objects, features, aspects and advantages of the technique will become more apparent from the following detailed description when taken in conjunction with the accompanying drawings.

BRIEF DESCRIPTION OF THE DRAWINGS

FIG. 3 is a block diagram illustrating a non-limiting exemplary internal configuration of the game apparatus 10;

FIG. 13 illustrates a non-limiting exemplary modification of a progress degree display image.

DETAILED DESCRIPTION OF NON-LIMITING EXAMPLE EMBODIMENTS

Figure 1:
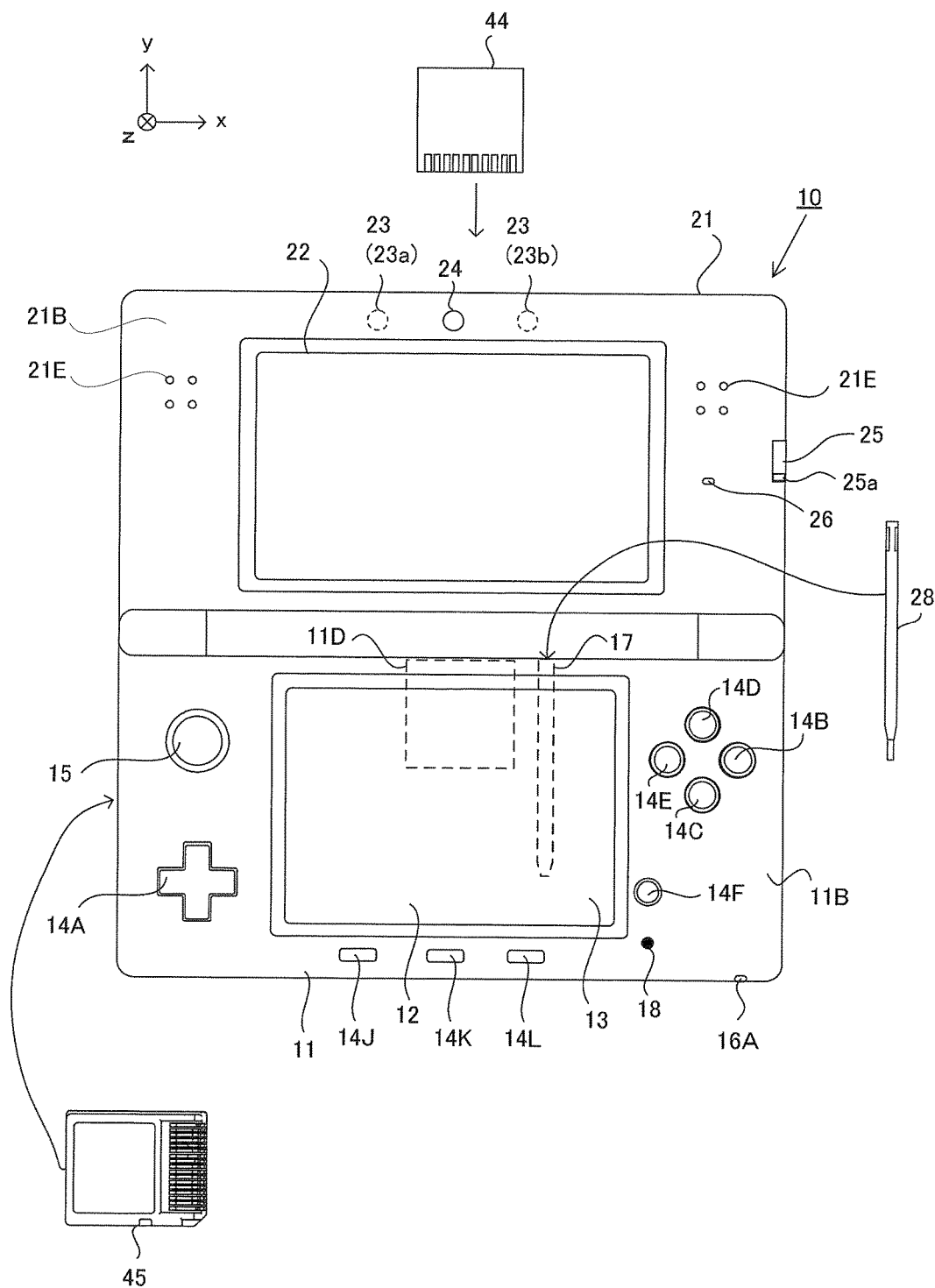
FIG. 1 is a front view showing a non-limiting example of a game apparatus 10 in an opened state.

Hereinafter, a game apparatus according to an exemplary embodiment of the technique will be described. A case in which the technique is applied to a game apparatus will be described below. However, the technique is applicable to any information processing apparatus as well as a game apparatus.

A game apparatus 10 is a hand-held game apparatus. As shown in FIG. 1 and FIGS. 2A to 2D, the game apparatus 10 has a lower housing 11 and an upper housing 21. The lower housing 11 and the upper housing 21 are connected to each other so as to be openable and closable (foldable).

As shown in FIG. 1 and FIGS. 2A to 2D, the lower housing 11 includes a lower LCD (liquid crystal display) 12, a touch panel 13, operation buttons 14A to 14L, an analog stick 15, LEDs 16A and 16B, an insertion opening 17, and a microphone hole 18.

The touch panel 13 is mounted on a screen of the lower LCD 12. The insertion opening 17 (indicated by dashed lines in FIG. 1 and FIG. 2D) for storing a touch pen 28 is formed in the upper side surface of the lower housing 11.

A cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11.

The analog stick 15 is a device for indicating a direction

The microphone hole 18 is formed in the inner side surface of the lower housing 11. Under the microphone hole 18, a microphone 42 (see FIG. 3) is provided as a sound input device described below.

Figure 2A:
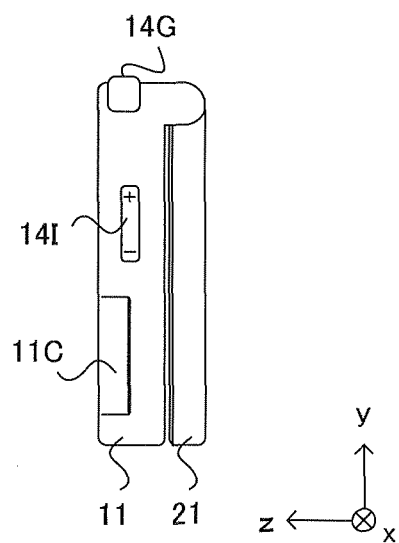
FIG. 2A is a left side view showing a non-limiting example of the game apparatus 10 in a closed state.
Figure 2B:
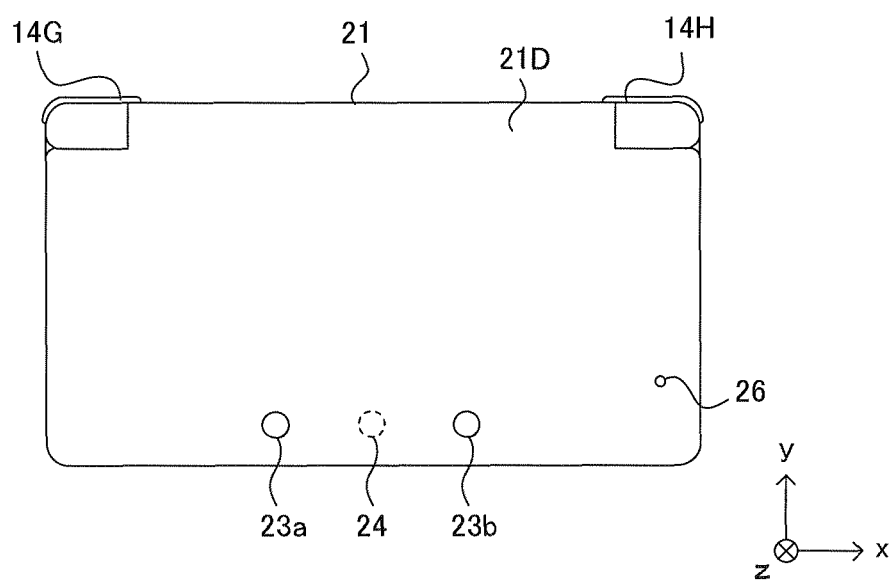
FIG. 2B is a front view showing a non-limiting example of the game apparatus 10 in the closed state.
Figure 2C:
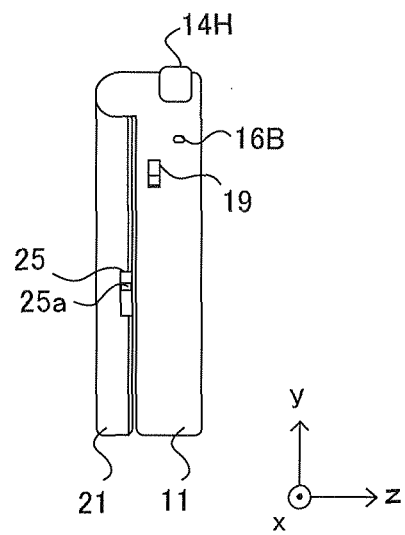
FIG. 2C is a right side view showing a non-limiting example of the game apparatus 10 in the closed state.
Figure 2D:
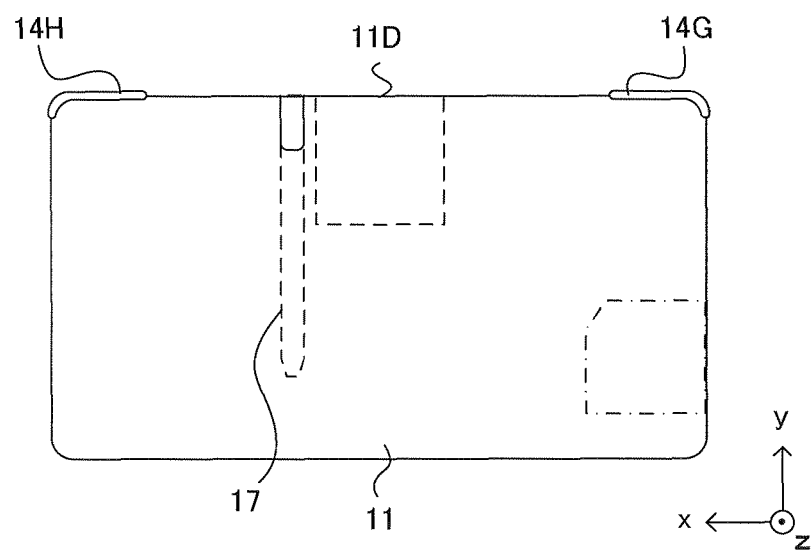
FIG. 2D is a rear view showing a non-limiting example of the game apparatus 10 in the closed state.

As shown in FIGS. 2B and 2D, an L button 14G and an R button 14H are provided on the upper side surface of the lower housing 11. Further, as shown in FIG. 2A, a sound volume button 14I for adjusting a sound volume of a speaker 43 (see FIG. 3) of the game apparatus 10 is provided on the left side surface of the lower housing 11.

As shown in FIG. 2A, a cover section 11C is provided on the left side surface of the lower housing 11 so as to be openable and closable. Inside the cover section 11C, a connector is provided for electrically connecting between the game apparatus 10 and an external data storage memory 45.

As shown in FIG. 2D, an insertion opening 11D through which an external memory 44 is inserted is formed in the upper side surface of the lower housing 11.

As shown in FIG. 1 and FIG. 2C, a first LED 16A for notifying a user of an ON/OFF state of a power supply of the game apparatus 10 is provided on the lower side surface of the lower housing 11, and a second LED 16B for notifying a user of an establishment state of a wireless communication of the game apparatus 10 is provided on the right side surface of the lower housing 11. The game apparatus 10 is capable of performing wireless communication with another apparatus. A wireless switch 19 for enabling/disabling the function of the wireless communication is provided on the right side surface of the lower housing 11 (see FIG. 2C).

As shown in FIG. 1 and FIG. 2, the upper housing 21 includes an upper LCD (liquid crystal display) 22, an outer imaging section 23 (an outer imaging section (left) 23a and an outer imaging section (right) 23b), an inner imaging section 24, a 3D adjustment switch 25, and a 3D indicator 26.

The upper LCD 22 is a display device capable of displaying a stereoscopically viewable image. Specifically, the upper LCD 22 is a display device capable of displaying, by utilizing a parallax barrier, a stereoscopically viewable image, which is visible by naked eye. A stereoscopic image (stereoscopically viewable image) for a user can be displayed on the upper LCD 22 such that a user is allowed to view a left eye image with her/his left eye and a right eye image with her/his right eye with the utilization of parallax barrier. The upper LCD 22 is allowed to disable the parallax barrier. When the parallax barrier is disabled, an image can be displayed in a planar manner. Thus, the upper LCD 22 is capable of switching between a stereoscopic display mode for displaying a stereoscopically viewable image and a planar display mode for displaying an image in a planar manner (for displaying a planar viewable image). The switching of the display mode is performed, for example, by using the 3D adjustment switch 25 which will be described below.

Two imaging sections (23a and 23b) provided in an outer side surface 21D of the upper housing 21 are generically referred to as the outer imaging section 23. The outer imaging section (left) 23a and the outer imaging section (right) 23b can be used as a stereo camera by the game apparatus 10 executing a program.

The inner imaging section 24 is provided in an inner side surface 21B of the upper housing 21 and acts as an imaging section that has an imaging direction that is the same direction as the inward normal direction normal to the inner side surface.

The 3D adjustment switch 25 is a slide switch, and is used for switching a display mode of the upper LCD 22 as described above. Further, the 3D adjustment switch 25 is used for adjusting a stereoscopic effect of a stereoscopically viewable image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is viewed is adjusted in accordance with the position of the slider 25a.

The 3D indicator 26 is implemented as a LED for indicating whether or not the upper LCD 22 is in the stereoscopic display mode.

Further, a speaker hole 21E is formed in the inner side surface of the upper housing 21. A sound is outputted through the speaker hole 21E from the speaker 43 described below.

Next, an internal electrical configuration of the game apparatus 10 will be described with reference to FIG. 3. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real time clock (RTC) 38, an acceleration sensor 39, a power supply circuit 40, an interface circuit (I/F circuit) 41, and the like.

The information processing section 31 includes: a CPU (central processing unit) 311 for executing a predetermined program; a GPU (graphics processing unit) 312 for performing image processing; and a VRAM (video RAM) 313. The CPU 311 executes a program stored in a memory (for example, the external memory 44 connected to the external memory I/F 33 or the internal data storage memory 35) in the game apparatus 10 to perform a process corresponding to the program. The program executed by the CPU 311 may be obtained from another apparatus by communication with the other apparatus. The GPU 312 generates an image in accordance with an instruction from the CPU 311, and renders the image in the VRAM 313. The image rendered in the VRAM 313 is outputted to the upper LCD 22 and/or the lower LCD 12, and the image is displayed on the upper LCD 22 and/or the lower LCD 12.

The external memory I/F 33 is an interface for detachably connecting to the external memory 44. The external data storage memory I/F 34 is an interface for detachably connecting to the external data storage memory 45.

The main memory 32 is a volatile storage device used as a work area and a buffer area for (the CPU 311 of) the information processing section 31.

The external memory 44 is a nonvolatile storage device for storing, for example, a program executed by the information processing section 31. The external memory 44 is implemented as, for example, a read-only semiconductor memory.

The external data storage memory 45 is implemented as a non-volatile memory (for example, a NAND flash memory) capable of performing reading and writing, and is used for storing any data.

The internal data storage memory 35 is implemented as a non-volatile memory (for example, a NAND flash memory) capable of performing reading and writing, and is used for storing predetermined data. For example, data or programs downloaded by wireless communication via the wireless communication module 36 is stored in the internal data storage memory 35.

The wireless communication module 36 has a function of connecting to a wireless LAN in a method compliant with, for example, the standard of IEEE 802.11b/g. Further, the local communication module 37 has a function of performing wireless communication with the same type of game apparatus in a predetermined communication method (for example, a communication based on an independent protocol, or infrared communication).

The acceleration sensor 39 detects magnitudes of accelerations (linear accelerations) in the directions of the straight lines along the three axial (xyz axial) directions, respectively. The information processing section 31 can receive data (acceleration data) representing accelerations detected by the acceleration sensor 39, and detect an orientation and a motion of the game apparatus 10.

The RTC 38 counts time and outputs the time to the information processing section 31. The information processing section 31 calculates a current time (date) based on the time counted by the RTC 38. The power supply circuit 40 controls power from a power source (rechargeable battery) of the game apparatus 10, and supplies power to each component of the game apparatus 10.

To the I/F circuit 41, the touch panel 13, the microphone 42, and the speaker 43 are connected. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The information processing section 31 acquires the touch position data, to obtain a position on which an input is made on the touch panel 13.

The operation button 14 includes the operation buttons 14A to 14L described above. Operation data indicating an input state of each of the operation buttons 14A to 14L (whether or not each button has been pressed) is outputted from the operation button 14 to the information processing section 31.

The lower LCD 12 and the upper LCD 22 are connected to the information processing section 31. Specifically, the information processing section 31 is connected to an LCD controller (not shown) of the upper LCD 22, and controls the LCD controller such that the parallax barrier is to be on or off. When the parallax barrier is set to ON in the upper LCD 22, a right eye image and a left eye image which are stored in the VRAM 313 of the information processing section 31 are outputted to the upper LCD 22. More specifically, the LCD controller alternately repeats reading of pixel data of the right eye image for one line in the vertical direction, and reading of pixel data of the left eye image for one line in the vertical direction, thereby reading, from the VRAM 313, the right eye image and the left eye image. Thus, an image to be displayed is divided into the right eye image and the left eye image each of which is a rectangle-shaped image having one line of pixels aligned in the vertical direction, and an image, in which the rectangle-shaped right eye image which is obtained through the division, and the rectangle-shaped left eye image which is obtained through the division are alternately aligned, is displayed on the screen of the upper LCD 22. A user views the images through the parallax barrier in the upper LCD 22, so that the right eye image is viewed by the user's right eye, and the left eye image is viewed by the user's left eye. Thus, the stereoscopically viewable image is displayed on the screen of the upper LCD 22.

The outer imaging section 23 and the inner imaging section 24 each take an image in accordance with an instruction from the information processing section 31, and output data of the taken image to the information processing section 31.

The 3D adjustment switch 25 transmits an electrical signal representing a position of the slider 25a, to the information processing section 31.

The information processing section 31 controls whether or not the 3D indicator 26 is to be lit up. For example, the information processing section 31 lights up the 3D indicator 26 when the upper LCD 22 is in the stereoscopic display mode.

(Outline of Data Transfer Process)

Next, an outline of a data transfer process executed by the game apparatus 10 will be described with reference to FIG. 4 to FIG. 10.

The game apparatus 10 has a function of performing transfer of any data (for example, application programs or image data) between another game apparatus and the game apparatus 10. Specifically, the game apparatus 10 is allowed to receive any data from another game apparatus, and transmit any data to another game apparatus, by executing a data transfer program described below.

Hereinafter, an outline of a process performed when the game apparatus 10 receives data from another game apparatus will be described.

When the game apparatus 10 starts the data transfer process, a progress degree display image is displayed, on the upper LCD 22, for indicating a degree of progress of the data transfer process. FIG. 4A to FIG. 4E show a non-limiting exemplary progress degree display image which is displayed on the upper LCD 22 while the data transfer process is being performed.

Figure 4A:
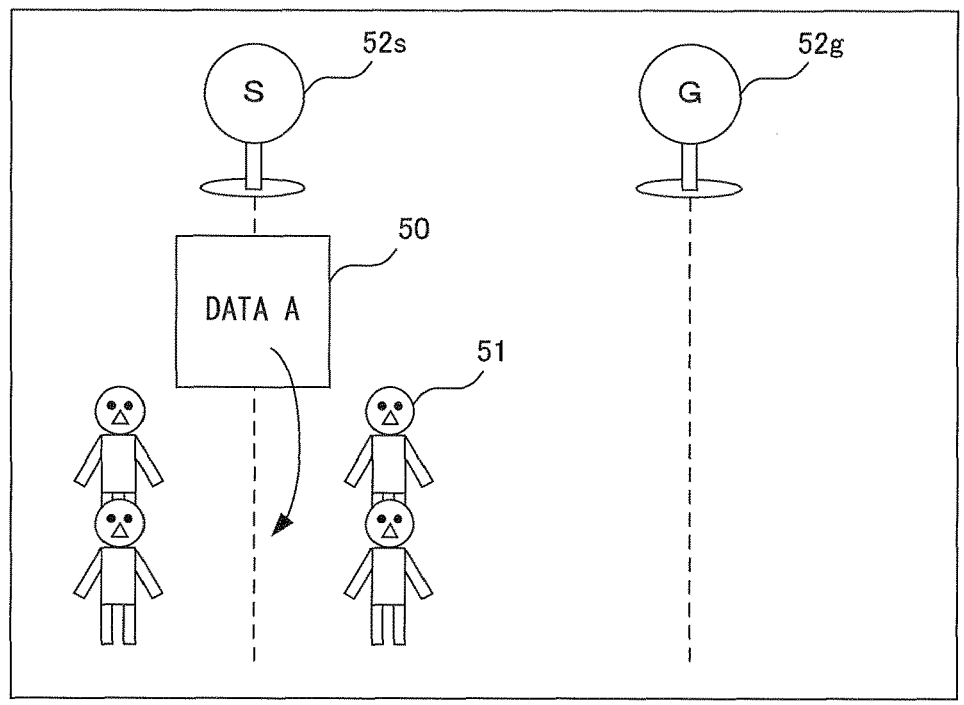
FIG. 4A illustrates a non-limiting exemplary image displayed on an upper LCD 22 when data having a small size is being transferred.

When the data transfer process for data A (in the embodiment described herein, a process of receiving the data A from another game apparatus) is started, the progress degree display image as shown in FIG. 4A is firstly displayed on the upper LCD 22. The progress degree display image shown in FIG. 4A includes an icon object 50 representing data to be processed in the data transfer process, a plurality of character objects 51, an indicator object 52s representing a start point, and an indicator object 52g representing a completion point. These objects are three-dimensional objects positioned in a three-dimensional virtual space. An image (stereoscopically viewable image) as shown in FIG. 4A is generated by these three-dimensional objects being rendered by a pair of virtual cameras.

Immediately after the data transfer process is started, the icon object 50 is located at the start point. An image representing a type or contents of the data to be processed in the data transfer process is indicated on the front surface (a surface displayed on the screen in FIG. 4A) of the icon object 50.

Figure 4B:
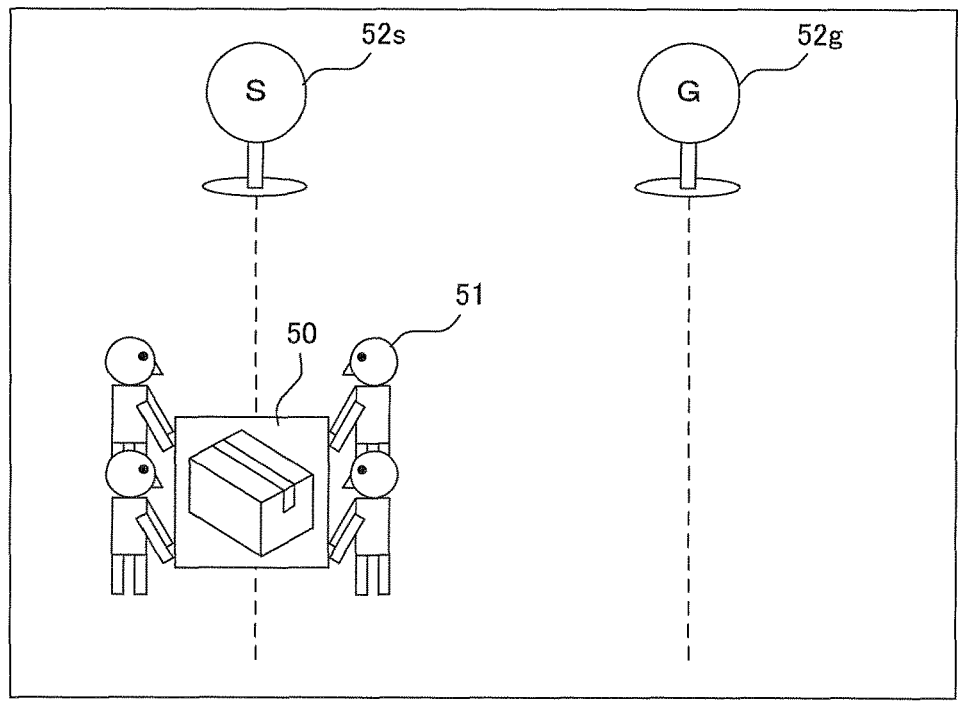
FIG. 4B illustrates a non-limiting exemplary image displayed on the upper LCD 22 when the data having the small size is being transferred.

Thereafter, the icon object 50 is reversed as indicated by an arrow in FIG. 4A, and a rear surface (on which an image such as a cardboard box or a gift box is drawn) of the icon object 50 is displayed as shown in FIG. 4B. Thereafter, a state in which the plurality of character objects 51 lift the icon object 50 and carry the icon object 50 from the start point toward the completion point, is displayed.

Figure 4C:
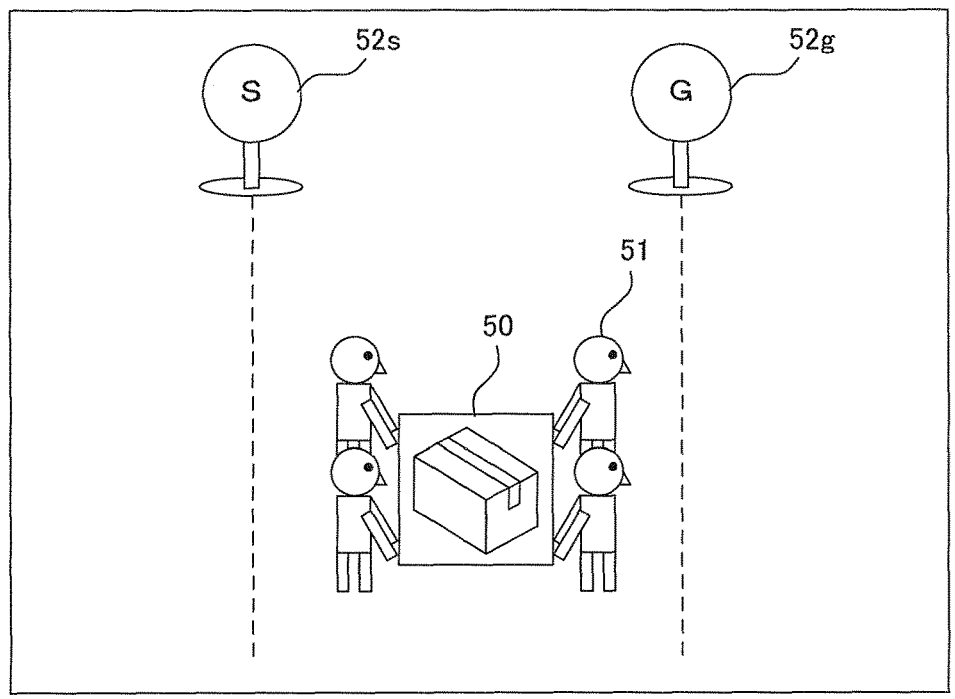
FIG. 4C illustrates a non-limiting exemplary image displayed on the upper LCD 22 when the data having the small size is being transferred.
Figure 4D:
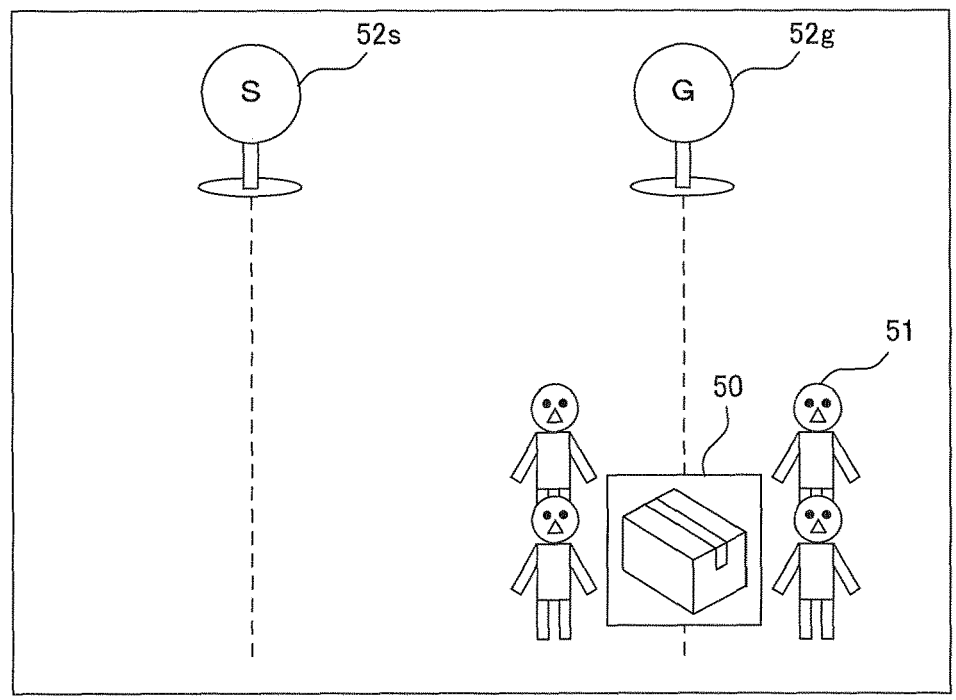
FIG. 4D illustrates a non-limiting exemplary image displayed on the upper LCD 22 when the data having the small size is being transferred.
Figures 4E, 5:
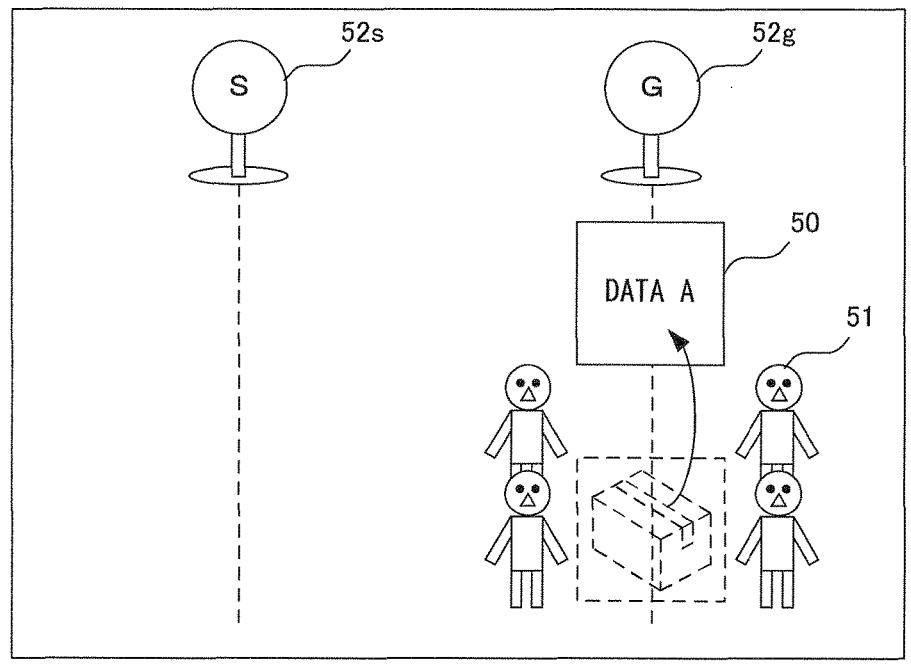
FIG. 4E illustrates a non-limiting exemplary image displayed on the upper LCD 22 when the data having the small size is being transferred.
FIG. 5 illustrates a non-limiting exemplary method for determining a distance from a start point to a completion point in a three-dimensional virtual space.

A movement of the plurality of character objects 51 (in other words, a movement of the icon object 50) is performed according to a degree of progress of the data transfer process. For example, when transfer of about half the data to be processed in the data transfer process has been completed, a state in which the icon object 51 is moving near a midpoint between the start point and the completion point as shown in FIG. 4C, is displayed. Near the completion of the data transfer process, a state in which the plurality of character objects 51 have carried the icon object 50 to the completion point as shown in FIG. 4D, is displayed. Thereafter, as shown in FIG. 4E, the icon object 50 is reversed, and the front surface of the icon object 50 is displayed again. Thus, a user can know that the transfer process for the data A has been completed.

As described above, in the present embodiment, the three-dimensional object (the plurality of character objects 51 and the icon object 50) is moved from the start point toward the completion point defined in the three-dimensional virtual space, according to a degree of progress of the data transfer process. Therefore, a user can recognize the progress state of the data transfer process, according to the most recent position of the three-dimensional object in the three-dimensional virtual space (that is, according to how far the three-dimensional object has moved from the start point, or how close the three-dimensional object is to the completion point as a result of the movement).

In the present embodiment, a distance from the start point to the completion point in the three-dimensional virtual space is determined depending on a data size of data to be processed in the data transfer process. Specifically, as shown in FIG. 5, when the data size is small (namely, when the data size represents a value less than a first threshold value), the distance from the start point to the completion point is set to D1. When the data size is medium (namely, when the data size represents a value which is greater than or equal to the first threshold value, and is less than a second threshold value), the distance from the start point to the completion point is set to D2 (D2>D1). When the data size is large (namely, when the data size represents a value greater than or equal to the second threshold value), the distance from the start point to the completion point is set to D3 (D3>D2). Information on the data size of the data to be processed in the data transfer process can be obtained from another game apparatus prior to the actual data transfer. In FIG. 5, indicator objects on which "25", "50", and "75" are indicated are shown. These indicator objects act as scale marks for indicating to a user the percentage of data transfer process that has been performed, as described below. In the present embodiment, the data size is determined by using two threshold values. However, a manner in which the data size is determined is not limited thereto. The data size may be determined more minutely (or more roughly) by using any kinds of threshold values.

Figures 6, 7A:
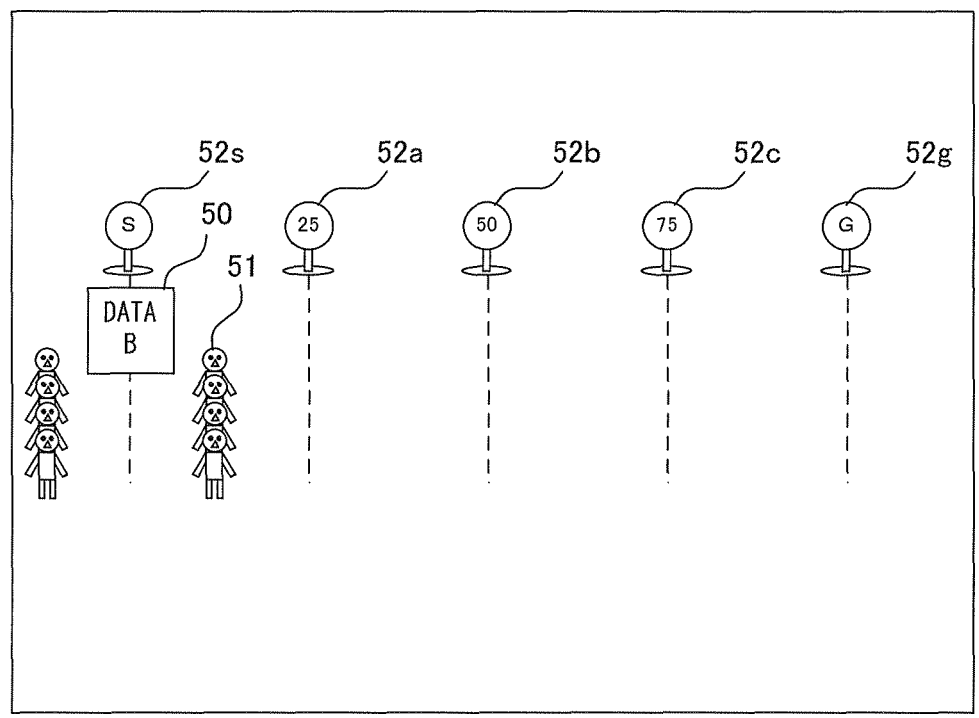
FIG. 6 illustrates a non-limiting exemplary method for determining a size of an icon and the number of characters.
FIG. 7A illustrate a non-limiting exemplary image displayed on the upper LCD 22 when data having a large size is being transferred.

Further, in the present embodiment, the size of the icon object 50 to be positioned in the three-dimensional virtual space and the number of the character objects 51 to be positioned therein are determined depending on a data size of data to be processed in the data transfer process. Specifically, as shown in FIG. 6, when the data size is small, the icon object 50 having a small size is positioned in the three-dimensional virtual space, and the number of the character objects 51 positioned in the three-dimensional virtual space is four. When the data size is medium, the icon object 50 having a medium size is positioned in the three-dimensional virtual space, and the number of the character objects 51 positioned in the three-dimensional virtual space is six. When the data size is large, the icon object 50 having a large size is positioned in the three-dimensional virtual space, and the number of the character objects 51 positioned in the three-dimensional virtual space is eight. The size of the icon object and the number of the character objects as described above are illustrative, and the icon object may have any size, and any number of the character objects can be positioned.

FIG. 4A to FIG. 4E illustrate a non-limiting exemplary case in which the data size is small. Hereinafter, an exemplary case in which the data size is large will be described with reference to FIG. 7A to FIG. 7E.

When the data transfer process for data B having a large size is started, a progress degree display image as shown in FIG. 7A is firstly displayed on the upper LCD 22. Namely, an image representing the entirety of a range from the start point to the completion point defined in the three-dimensional virtual space is displayed. Thus, a user can intuitively know that the transfer process for the data B requires a longer time period than the transfer process for the data A.

Figure 7B:
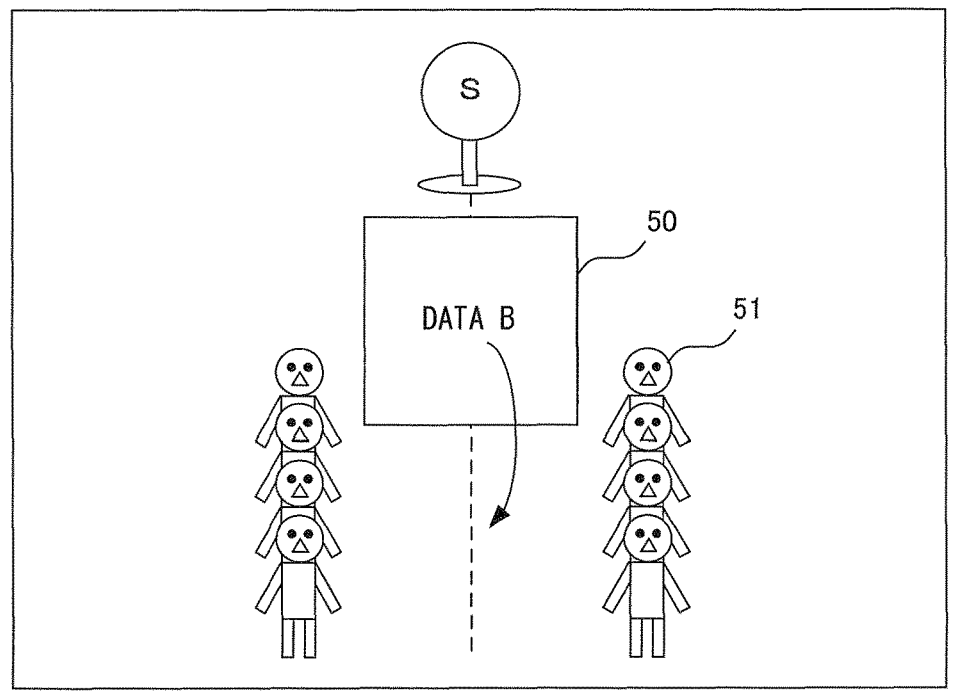
FIG. 7B illustrate a non-limiting exemplary image displayed on the upper LCD 22 when the data having the large size is being transferred.

Immediately after that, the start point in the three-dimensional virtual space is zoomed in, and an image as shown in FIG. 7B is displayed. In the image shown in FIG. 7B, each character object 51 is displayed at almost the same display size (a size on the screen) as in the images shown in FIG. 4A to FIG. 4E. As a result, in the image shown in FIG. 7B, the completion point (and the indicator object 52g representing the completion point) is not displayed (that is, the completion point is located outside the screen).

Figure 7C:
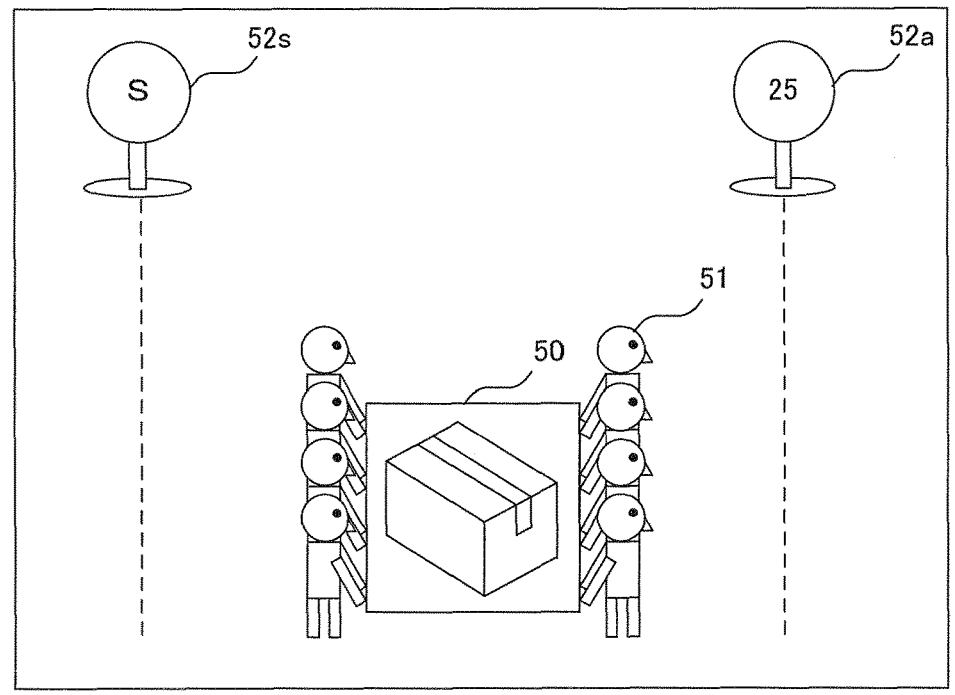
FIG. 7C illustrate a non-limiting exemplary image displayed on the upper LCD 22 when the data having the large size is being transferred.
Figure 7D:
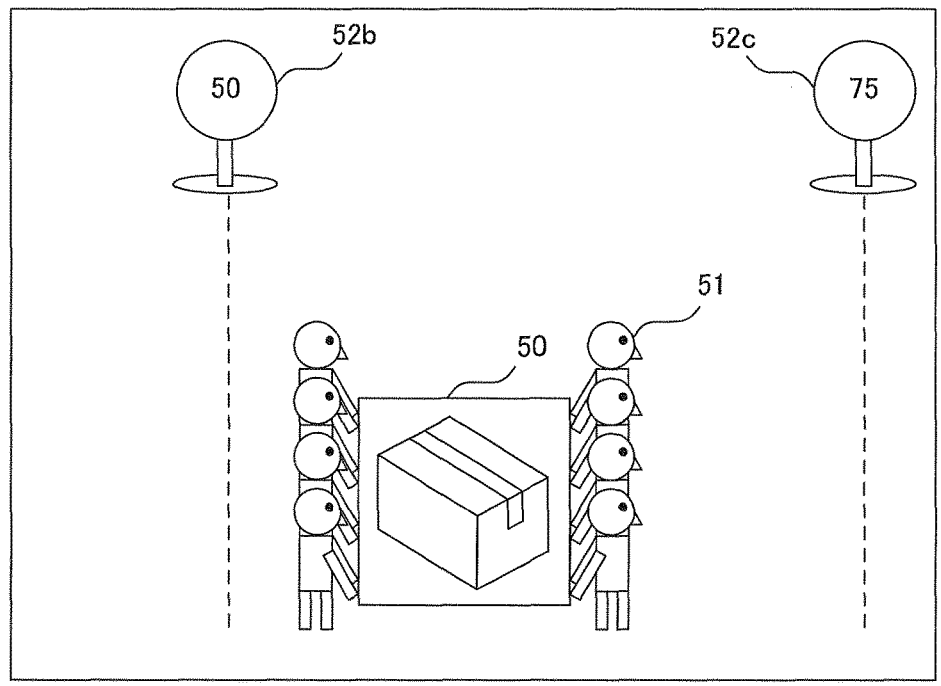
FIG. 7D illustrates a non-limiting exemplary image displayed on the upper LCD 22 when the data having the large size is being transferred.
Figure 7E:
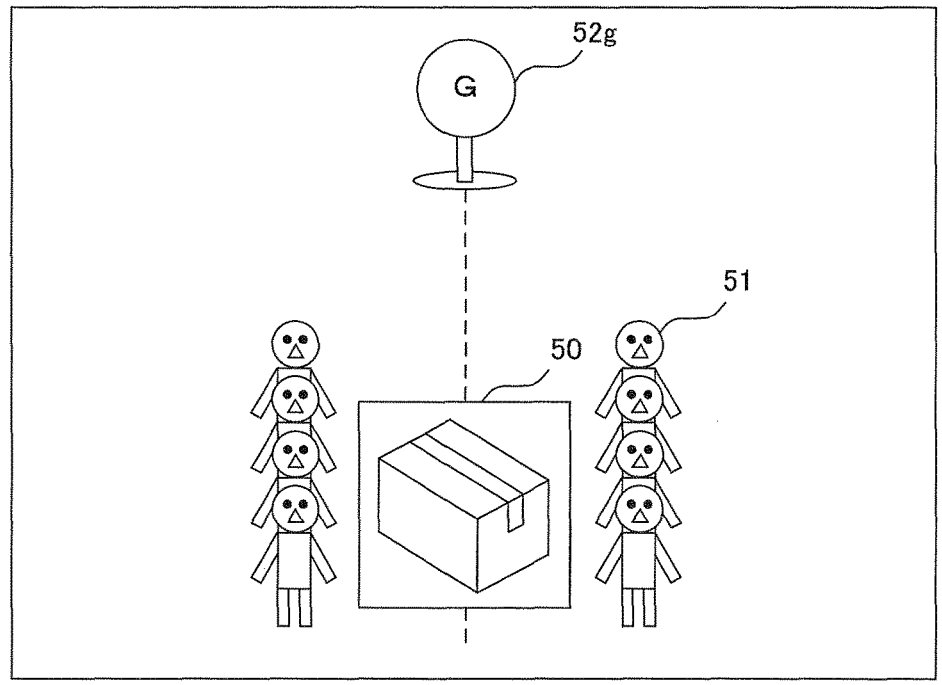
FIG. 7E illustrates a non-limiting exemplary image displayed on the upper LCD 22 when the data having the large size is being transferred.

Thereafter, the icon object 50 is reversed, and a state in which the plurality of character objects 51 lift the icon object 50, and carry the icon object 50 from the start point toward the completion point according to the degree of progress of the data transfer process, is displayed. At this time, as shown in FIG. 7C to FIG. 7E, a display range is sequentially shifted according to the degree of progress of the data transfer process so as to constantly display the icon object 50 on the screen. The display range may be shifted smoothly (that is, continuously) according to the movement of the icon object 50, or the display range may be shifted by a predetermined distance (that is, stepwise) each time the icon object 50 moves over a predetermined distance.

In the data transfer process for data having a large size, since the distance between the start point and the completion point is great, neither the indicator object 52s representing the start point nor the indicator object 52g representing the completion point may be displayed during the data transfer process. The same can be said for the data transfer process for data having a medium size. Also in this state, in order to allow a user to easily recognize the most recent degree of progress (namely, the percentage of the process which has been performed, relative to the entirety of the process) of the data transfer process, the appropriate number of indicator objects (for example, indicator objects 52a to 52c as shown in FIG. 7A) are positioned, between the start point and the completion point, so as to be spaced from each other by an appropriate distance, in the present embodiment. As a result, as shown in FIG. 7D, even in a state where neither the start point nor the completion point are displayed, a user can easily recognize the most recent degree of progress based on the indicator object 52b or the like.

Thus, in the present embodiment, a distance from the start point to the completion point in the three-dimensional virtual space is determined depending on a data size of the data to be processed in the data transfer process, so that a user can intuitively know a time required for the data transfer process. Further, also when the distance from the start point to the completion point is long, a state in which the icon object 50 and the character objects 51 are moving is displayed on the screen in an enlarged manner. Therefore, a user can easily know that the data transfer process is being reliably performed. Further, since the three-dimensional virtual space is scrolled to change the display range according to the degree of progress of the data transfer process, the progress degree display image is prevented from becoming monotonous. Further, minute movements of the character objects 51 can be observed. Therefore, a user can be prevented from becoming bored with waiting for completion of the data transfer process.

In the present embodiment, an introductory performance is performed when the data transfer process is started, such that a user can feel as if a plurality of characters do their best to move data for the user in a space (namely, in the upper housing 21 of the game apparatus 10) in the game apparatus 10.

Figure 8A:
FIG. 8A illustrates a non-limiting exemplary wiping process performed at the start of a data transfer.
Figure 8B:
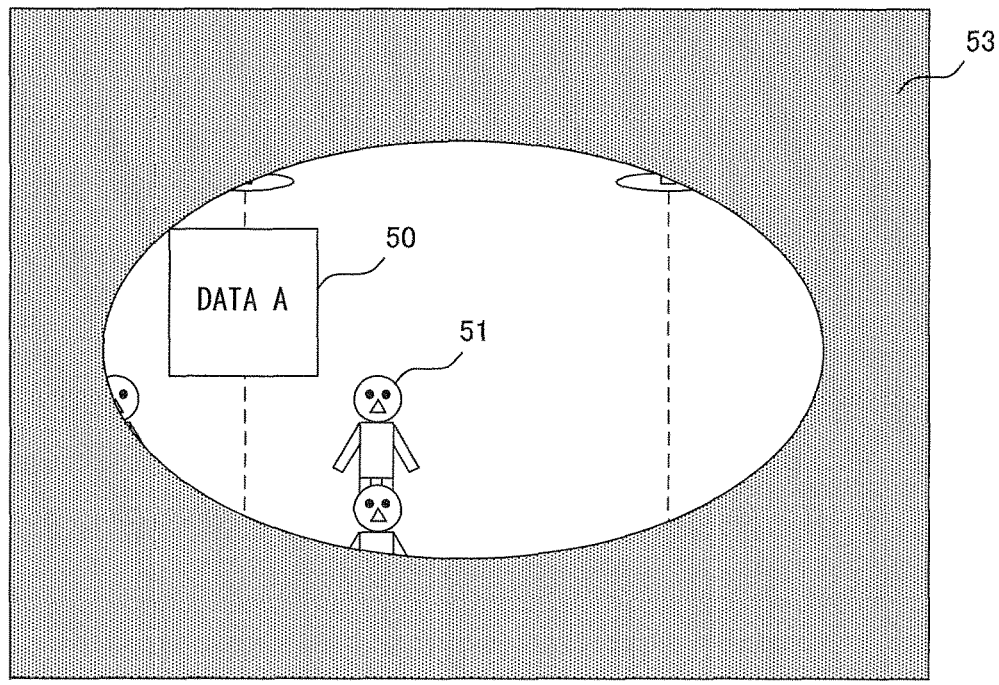
FIG. 8B illustrates a non-limiting exemplary wiping process performed at the start of the data transfer.

Specifically, in a state in which an instruction from a user for starting the data transfer process is awaited, for example, a screen object 53 as shown in FIG. 8A is displayed at the same depth position as the screen of the upper LCD 22 (namely, the user visually recognize the screen object 53 so as to feel that the screen object 53 is positioned at the same depth position as the screen of the upper LCD 22). When the instruction for starting the data transfer process is issued, a hole is formed and enlarged at the center of the screen object 53 as shown in FIG. 8B by a wiping process described below, and three-dimensional objects such as the character objects 51 appear inside the hole (namely, at a depth position that is deeper than the position of the screen of the upper LCD 22 as viewed from the user). Thus, the user feels strange as if a hole is formed on the screen of the upper LCD 22, and a world inside the upper housing 21 can be viewed.

Figure 9A:
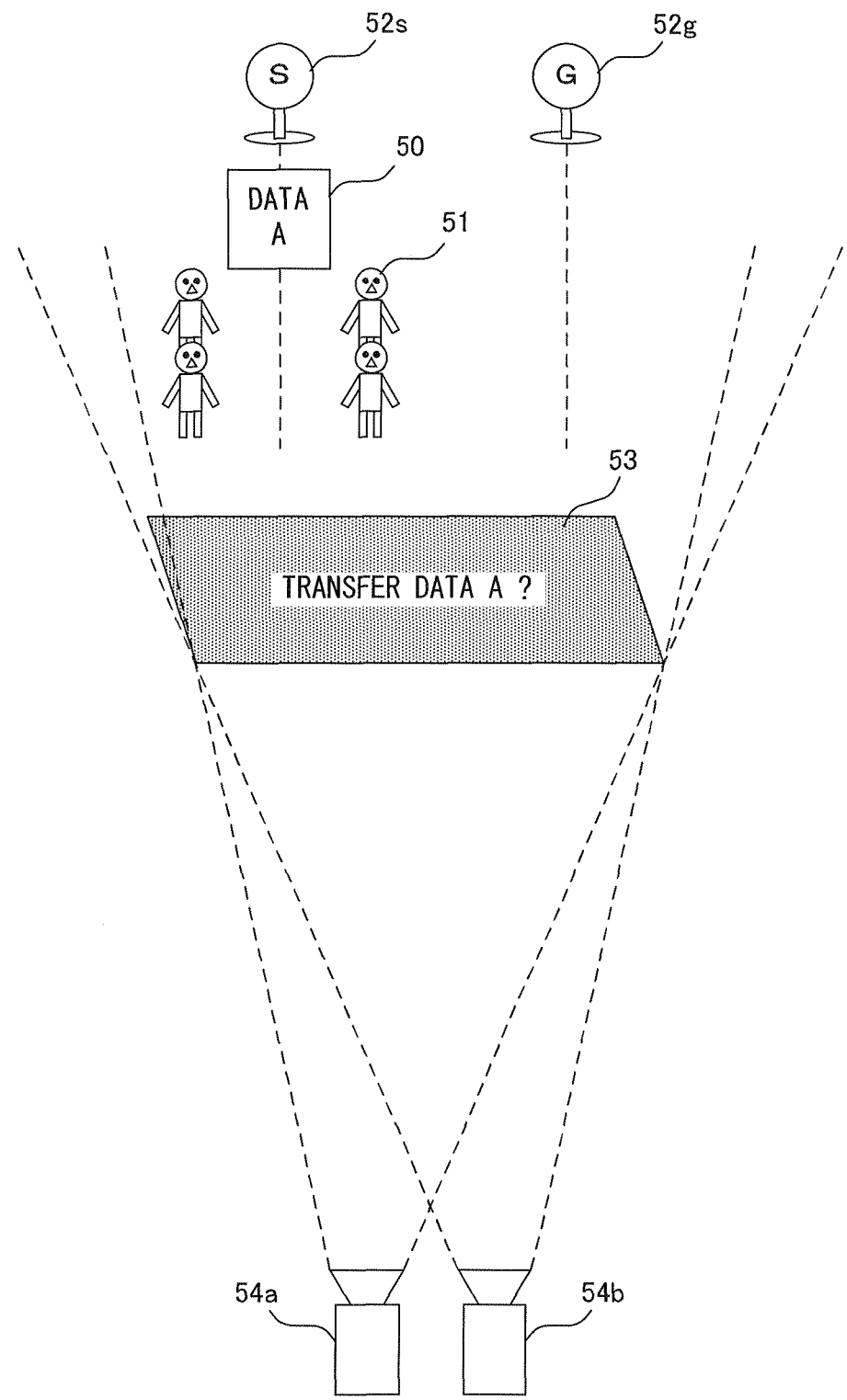
FIG. 9A illustrates a non-limiting exemplary method for implementing the wiping process.
Figure 9B:
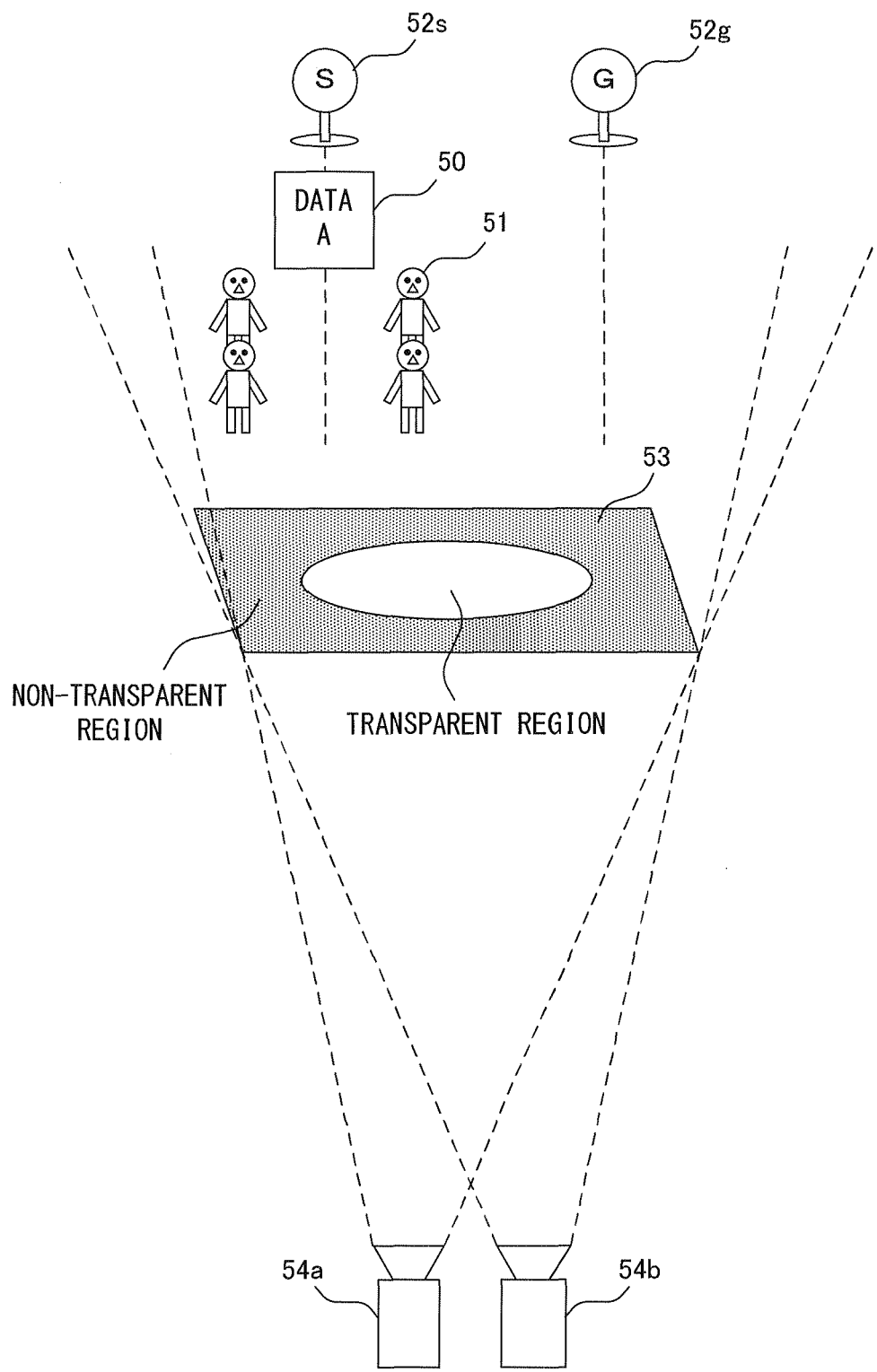
FIG. 9B illustrates the non-limiting exemplary method for implementing the wiping process.
Figure 10:
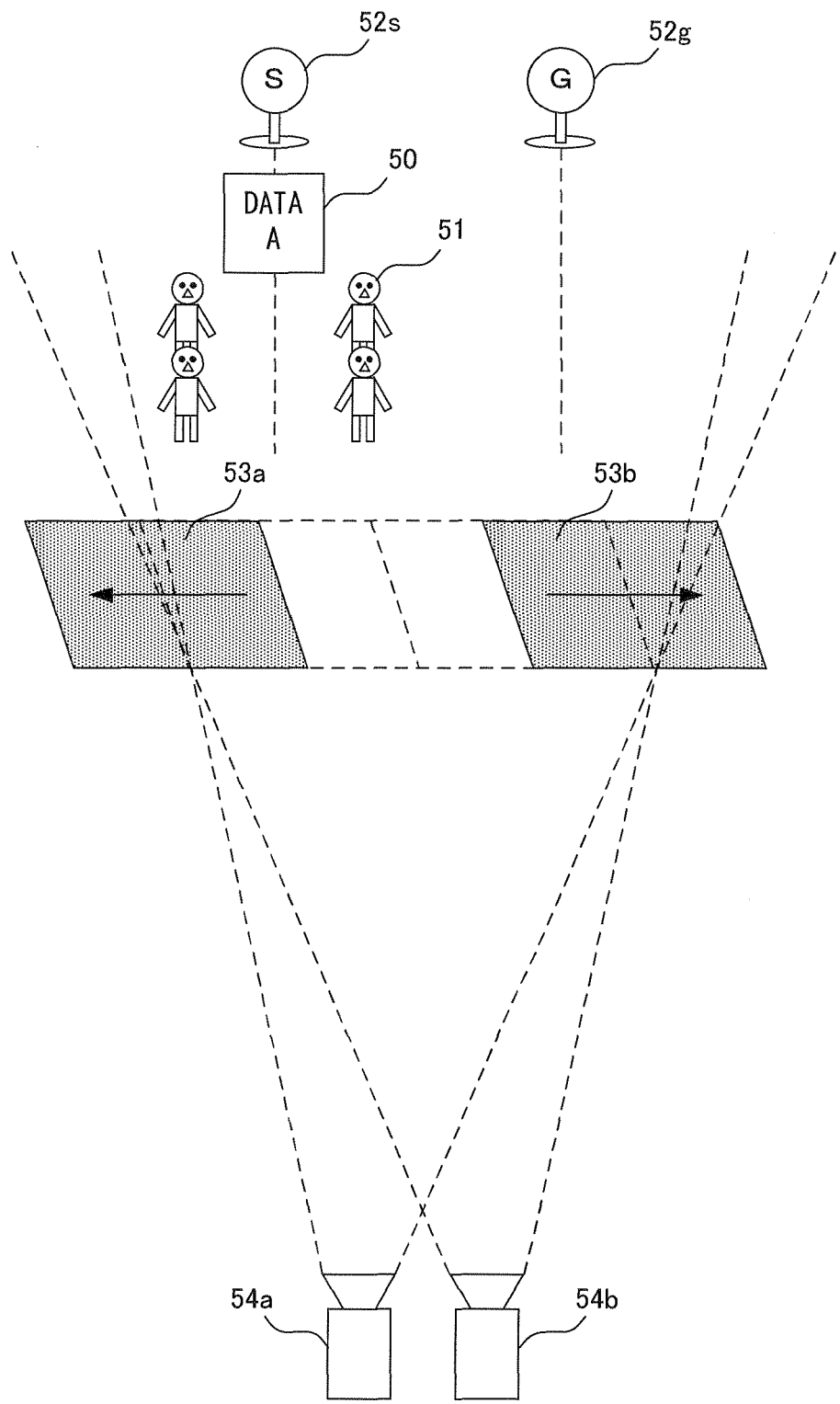
FIG. 10 illustrates another non-limiting exemplary method for implementing the wiping process.

The above-described introductory performance using a display device capable of displaying an image which is stereoscopically visible by naked eye can be performed in a case where a pair of virtual cameras 54a and 54b is located in front of the screen object 53, and the character objects 51 and the like are located at a deeper position than the screen object 53, so as to satisfy a positional relationship as shown in, for example, FIG. 9A. When an instruction for starting the data transfer process is issued, a transparent region is enlarged at the center of the screen object 53 as shown in FIG. 9B, thereby enabling a performance (wiping process) in which a hole is formed and enlarged in the screen of the upper LCD 22 to be performed. Instead of the screen object 53 becoming transparent, the screen object may be moved so as to be out of sight. For example, in an example shown in FIG. 10, the screen object 53 including a left half portion 53a and a right half portion 53b is moved such that the left half portion 53a and the right half portion 53b are moved away from each other, and the screen of the upper LCD 22 is opened in the same manner as a door, so that a user can feel as if the world inside the upper housing 21 emerges.

Next, an operation performed by the game apparatus 10 for realizing the data transfer process as described above will be described in detail with reference to FIG. 11 and FIG. 12.

Figure 11:
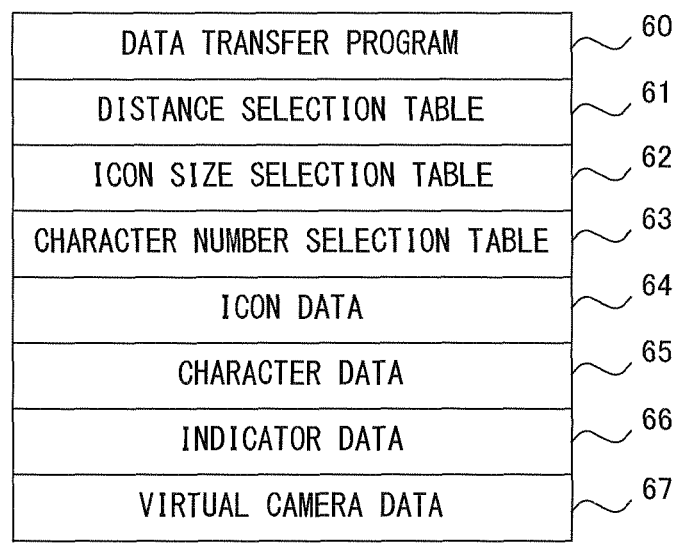
FIG. 11 illustrates a non-limiting exemplary memory map of a main memory 32.
Figure 12:
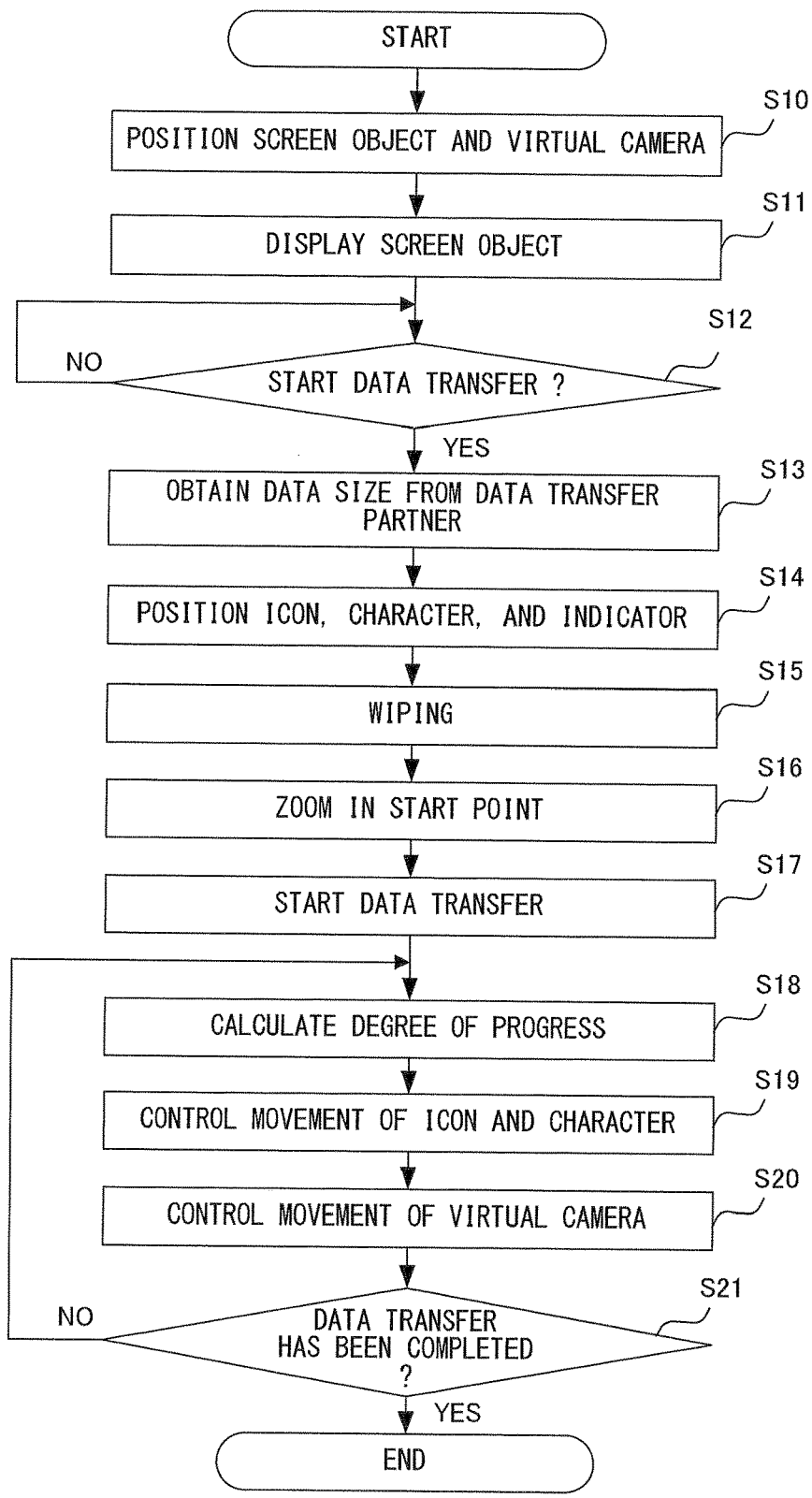
FIG. 12 is a flow chart showing a non-limiting exemplary flow of a process based on a data transfer program.

FIG. 11 illustrates non-limiting examples of programs and data which are stored in the main memory 32 in order to execute the data transfer process. In the present embodiment, a data transfer program 60 for causing the CPU 311 to execute the data transfer process, a distance selection table 61 as shown in FIG. 5, an icon size selection table 62 as shown in FIG. 6, a character number selection table 63, icon data 64, character data 65, indicator data 66, and virtual camera data 67 are stored in the main memory 32.

The data transfer program 60 is typically loaded from the internal data storage memory 35 into the main memory 32. In another embodiment, the data transfer program 60 may be loaded into the main memory 32 from any information storage medium such as the external memory 44, or may be received from another game apparatus or a server device and loaded into the main memory 32.

The distance selection table 61 is a table used for determining a distance from the start point to the completion point, according to a size of data to be processed in the data transfer process. In another embodiment, a distance from the start point to the completion point may be determined by using a function for converting a data size to a distance.

The icon size selection table 62 is a table used for determining a size of the icon object 50 to be positioned in the three-dimensional virtual space, according to a size of data to be processed in the data transfer process.

The character number selection table 63 is a table used for determining the number of the character objects 51 to be positioned in the three-dimensional virtual space, according to a size of data to be processed in the data transfer process.

The icon data 64 is a collection of data associated with the icon object 50 positioned in the three-dimensional virtual space. The icon data 64 contains information on, for example, a shape and a design of the icon object 50, and a position and an orientation of the icon object 50 in the three-dimensional virtual space.

The character data 65 is a collection of data associated with the character objects 51 positioned in the three-dimensional virtual space. The character data 65 contains information on, for example, a shape of a design of each of the character objects 51, and a position and an orientation of each of the character objects 51 in the three-dimensional virtual space.

The indicator data 66 is a collection of data associated with the indicator objects 52 positioned in the three-dimensional virtual space. The indicator data 66 contains information on, for example, a shape and a design of each of the indicator objects 52, and a position and an orientation of each of the indicator objects 52 in the three-dimensional virtual space.

The virtual camera data 67 is a collection of data associated with the pair of virtual cameras 54a and 54b positioned in the three-dimensional virtual space. The virtual camera data 67 contains information on, for example, positions, orientations, and angles of view of the paired virtual cameras 54a and 54b in the three-dimensional virtual space.

Next, a flow of a process executed by the CPU 311 based on the data transfer program 60 will be described with reference to a flow chart shown in FIG. 12.

Firstly, in step S10, the CPU 311 positions the screen object 53 and the pair of virtual cameras 54a and 54b in the three-dimensional virtual space (see FIG. 9A).

In step S11, the CPU 311 renders the screen object 53 by using the pair of virtual cameras 54a and 54b, and displays the obtained image on the upper LCD 22 in a stereoscopically viewable manner (see FIG. 8A). The rendering process may be executed by the GPU 312 according to an instruction from the CPU 311.

In step S12, the CPU 311 determines whether or not an instruction for starting a data transfer is inputted by a user, based on an input from the operation button 14, the touch panel 13, or the like. When an instruction for starting the data transfer is inputted, the process is advanced to step S13. Otherwise, the game apparatus 10 enters a waiting state.

In step S13, the CPU 311 obtains information on a size of data to be transferred, from a game apparatus corresponding to a communication partner in the data transfer process. The obtained information is stored in the main memory 32.

In step S14, the CPU 311 determines a distance from the start point to the completion point, a size of the icon object 50, and the number of the character objects 51, based on the information on the size of data which has been obtained in step S13, with reference to the distance selection table 61, the icon size selection table 62, and the character number selection table 63. The icon object 50, the plurality of character objects 51, and the plurality of indicator objects 52 are positioned in the three-dimensional virtual space (see FIG. 9A).

In step S15, the CPU 311 performs the wiping process (see FIG. 8B and FIG. 9B).

In another embodiment, the screen object 53 may disappear from the screen of the upper LCD 22 in any manner different from the wiping process.

In step S16, the CPU 311 changes at least one of the position and the angle of view of the pair of virtual cameras 54a and 54b, so as to shift to a state in which the start point is zoomed in, from a state in which the entirety of the range from the start point to the completion point in the three-dimensional virtual space is viewable.

In step S17, the CPU 311 starts the data transfer (namely, reception of data from the game apparatus corresponding to the communication partner in the data transfer process).

In step S18, the CPU 311 calculates a degree of progress (for example, a ratio (%) of a size of the data having been received before and in the most recent process loop, relative to a total data size) of the data transfer process, based on the information on the size (that is, the total data size) of the data which has been obtained in step S13, and a size of the data having been received before and in the most recent process loop. However, the degree of progress of the data transfer process may be calculated in another manner. In another embodiment, information indicating the degree of progress may be embedded in data transmitted from another game apparatus, and the information may be extracted from the received data, thereby detecting the degree of progress of the data transfer process.

In step S19, the CPU 311 changes positions of the icon object 50 and the character objects 51 according to the degree of progress of the data transfer process.

In step S20, the CPU 311 moves positions of the paired virtual cameras 54a and 54b according to the degree of progress of the data transfer process (or, according to the position of the icon object 50 or the positions of the character objects 51).

In step S21, the CPU 311 determines whether or not the data transfer has been completed. When the data transfer has been completed, the data transfer process is ended. Otherwise, the process is returned to step S18.

As described above, according to the present embodiment, a portion of the progress degree display image (specifically, a range between the start point and the completion point in the three-dimensional virtual space) is displayed on the screen, and a display range of the progress degree display image displayed on the screen is sequentially shifted according to the degree of progress of the data transfer process (namely, the progress degree display image is scrolled). Therefore, a user can easily know that the icon object 50 and the like are moving, by viewing the screen, and the user can easily recognize the degree of progress of the data transfer process. For example, if the icon object 50 and the like are moved according to the degree of progress in a state shown in FIG. 7A (namely, in a state in which the entirety of the range from the start point to the completion point is displayed on the screen), when a huge amount of data is transferred, it may not be immediately determined whether the icon object 50 and the like are moving or have stopped (namely, whether the data transfer process is normally continued or interrupted due to some communication error). On the other hand, when a vicinity of the most recent positions of the icon object 50 and the like is enlarged and displayed on the screen as shown in, for example, FIG. 7C, it can be easily determined whether the icon object 50 and the like are moving or have stopped.

Further, according to the present embodiment, a portion (namely, a vicinity of the most recent positions of the icon object 50 and the like) of the progress degree display image which represents the most recent degree of progress, is constantly displayed on the screen, so that a user is allowed to easily recognize the most recent degree of progress.

Further, according to the present embodiment, a display range of the progress degree display image is sequentially shifted so as to change from the start point toward the completion point in the three-dimensional virtual space, so that a user is allowed to recognize the most recent degree of progress according to the display range of the progress degree display image.

Moreover, according to the present embodiment, a distance from the start point to the completion point is determined depending on a data size of data to be processed in the data transfer process, so that a user is allowed to intuitively recognize an approximate time required for the data transfer process.

Furthermore, according to the present embodiment, the indicator object 52 which functions as a scale mark representing a degree of progress is appropriately positioned between the start point and the completion point. Therefore, even in a state where neither the start point nor the completion point are displayed on the screen, a user is allowed to easily recognize the most recent degree of progress. In another embodiment, the degree of progress may be indicated to a user by using any other display manner without using the indicator object 52. For example, a brightness of a background may be changed according to the degree of progress.

Moreover, according to the present embodiment, when the data transfer process is started, the entirety of the progress degree display image (namely, the entirety of the range from the start point to the completion point) is displayed on the screen, and thereafter a portion of the progress degree display image (namely, the vicinity of the start point) is enlarged and displayed on the screen. Therefore, a user is allowed to intuitively recognize an approximate time required for the data transfer process.

Further, according to the present embodiment, the degree of progress of the data transfer process is indicated by moving the three-dimensional object such as the icon object 50 in the three-dimensional virtual space. Therefore, the display is not monotonous, which is different from a conventional progress bar. Thus, a user may not become bored while the user is waiting for completion of the data transfer process.

(Modification)

In the present embodiment, a game apparatus on a data reception side displays the progress degree display image. In another embodiment, a game apparatus on a data transmission side may display the progress degree display image.

Further, according to the present embodiment, an exemplary case in which the degree of progress of the data transfer process is displayed, is described. However, the technique is not limited thereto. The technique may be applied to display of a degree of progress of any information processing task such as a download of data from a server device, and an installation of a program into an internal storage device.

Furthermore, according to the present embodiment, the degree of progress is displayed by moving the three-dimensional object in the three-dimensional virtual space. However, in another embodiment, for example, as shown in FIG. 13, the degree of progress may be displayed by using figures represented in a two-dimensional manner, or the like. In the example shown in FIG. 13, a bar is extended according to a degree of progress, and the progress degree display image (including a scale mark display) is scrolled for display such that a portion (the head portion of the bar) of the bar which represents the degree of progress is constantly displayed on the screen.

Further, according to the present embodiment, the degree of progress is calculated and displayed according to a data size. However, in another embodiment, the degree of progress may be calculated and displayed according to a processing time (or an estimated processing time) instead of the data size.

Moreover, according to the present embodiment, the data transfer process is executed by one CPU 311. However, in another embodiment, the data transfer process may be shared and executed by a plurality of the CPUs 311.

Furthermore, according to the present embodiment, the data transfer process is executed by one game apparatus 10. However, in another embodiment, the data transfer process may be shared and executed by a plurality of information processing apparatuses which can communicate with each other.

Moreover, according to the present embodiment, the data transfer process is executed, according to the data transfer program 60, by the CPU 311. However, in another embodiment, a portion of the data transfer process may be implemented by hardware different from the CPU 311.

Furthermore, according to the present embodiment, the progress degree display image is displayed by a display device (that is, the upper LCD 22) capable of displaying an image which is stereoscopically visible by naked eye. However, in another embodiment, the progress degree display image may be displayed by any display device.

While the technique has been described in detail, the foregoing description is in all aspects illustrative and not restrictive. It will be understood that numerous other modifications and variations can be devised without departing from the scope of the technique.

What is claimed is:

1. An information processing apparatus with a display having at least one screen, the information processing apparatus comprising:
   a processor; and
   a memory configured to store computer readable instructions that, when executed by the processor, cause the information processing apparatus to perform:
   executing a predetermined information processing task;
   generating a virtual scene space from which a virtual camera produces a progress degree display image, the progress degree display image including virtual characters and indicating a degree of progress to which the predetermined information processing task has been executed;
   displaying, on the at least one screen, either an image of an entirety of the virtual scene space or an image of a partial region of the virtual scene space, the displayed partial region being indicative of a most recent degree of progress of the predetermined information processing task; and
   changing a position of a viewpoint produced by the virtual camera within the virtual scene space so as to sequentially shift the displayed partial region from a first position representing a start position of the predetermined information processing task toward a second position representing a completion position of the predetermined information processing task, the displayed partial region being used as a display range within the virtual scene space such that at least the most recent degree of progress is constantly displayed on the at least one screen in accordance with a change in degree of progress of a performance of the predetermined information processing task,
   wherein in the displaying, the image of the entirety of the virtual scene space is displayed on the screen at least in some period, and wherein a length of spatial separation between the first position and the second position in the virtual scene space is set corresponding to an amount of information or an amount of data to be processed in the predetermined information processing task, or an amount of time required for the predetermined information processing task to be performed,
   wherein the progress degree display image includes an indicator located between the first position and the second position and representing a progress degree corresponding to a position between the first position and the second position, and
   wherein a number of virtual characters are displayed in accordance with, at least, the amount of data to be processed.

2. The information processing apparatus according to claim 1, wherein
   the progress degree display image includes a portion representing the most recent degree of progress, and
   the position of a predetermined limited portion within an entirety of the progress degree display image is sequentially shifted so as to display, the portion representing the most recent degree of progress which is included in the progress degree display image.

3. The information processing apparatus according to claim 1, wherein a distance from the first position to the second position is changed according to the amount of data to be processed in the predetermined information processing task.

4. The information processing apparatus according to claim 1, wherein a distance from the first position to the second position is changed according to the amount of time required for the predetermined information processing task to be performed.

5. The information processing apparatus according to claim 1, wherein the progress degree display image includes a position display located between the first position and the second position, and the position display represents the degree of progress between the first position and the second position.

6. The information processing apparatus according to claim 5, wherein the position display is located between the first position and the second position in the progress degree display image at predetermined intervals.

7. The information processing apparatus according to claim 1, wherein, when execution of the predetermined information processing task is started, the entirety of the progress degree display image is displayed, and thereafter a portion of the progress degree display image is enlarged and displayed on the at least one screen, and the display range of the progress degree display image is then shifted sequentially according to the degree of progress of the predetermined information processing task.

8. The information processing apparatus according to claim 1, wherein the progress degree display image is an image representing a three-dimensional virtual space including a predetermined three-dimensional object, and the three-dimensional object is moved from a first point in the three-dimensional virtual space, toward a second point in the three-dimensional virtual space, according to the degree of progress of the predetermined information processing task, and the first point represents a start point of the predetermined information processing task, and the second point represents a completion point of the predetermined information processing task, and the virtual camera is controlled so as to follow the three-dimensional object, so that the progress degree display image is generated.

9. The information processing apparatus according to claim 1, wherein the predetermined information processing task includes at least one of a data reception process, a data transmission process, a data writing process for writing data in a storage device, and a data reading process for reading data from the storage device.

10. The information processing apparatus according to claim 1, wherein the progress degree display image includes a portion representing the most recent degree of progress, and the most recent degree of progress is displayed by changing, in the progress degree display image, a relative position of the portion representing the most recent degree of progress, according to the degree of progress.

11. The information processing apparatus according to claim 1, wherein the progress degree display image includes a portion representing the most recent degree of progress, the most recent degree of progress is displayed by moving, in the progress degree display image, a display position of the portion representing the most recent degree of progress, according to the degree of progress, and a predetermined character object is displayed on the at least one screen, and the display position of the portion representing the most recent degree of progress is moved in the progress degree display image by using the predetermined character object.

12. The information processing apparatus according to claim 1, wherein a size of the virtual character an icon object associated with the virtual characters changes based on the amount of data to be processed.

13. The information processing apparatus according to claim 1, wherein the virtual characters appear inside the progress display image at a depth position that is deeper than a position of the screen.

14. The information processing apparatus according to claim 1, wherein the progress degree display image includes progress markers, and a number of progress markers are determined based on the amount of data to be processed.

15. An information processing system, comprising:

a display having at least one screen; and processing circuitry including at least one processor, the processing circuitry configured to perform:

executing a predetermined information processing task;

generating a virtual scene space from which a virtual camera produces a progress degree display image, the progress degree display image including virtual characters and indicating a degree of progress to which the predetermined information processing task has been executed;

displaying, on the at least one screen, either an image of an entirety of the virtual scene space or an image of a partial region of the virtual scene space, the displayed partial region being indicative of a most recent degree of progress of the predetermined information processing task; and changing a position of a viewpoint produced by the virtual camera within the virtual scene space so as to sequentially shift the displayed partial region from a first position representing a start position of the predetermined information processing task toward a second position representing a completion position of the predetermined information processing task, the displayed partial region being used as a display range within the virtual scene space such that at least the most recent degree of progress is constantly displayed on the at least one screen in accordance with a change in degree of progress of a performance of the predetermined information processing task, wherein in the displaying, the image of the entirety of the virtual scene space is displayed on the screen at least in some period, and wherein a length of spatial separation between the first position and the second position in the virtual scene space is set corresponding to an amount of information or an amount of data to be processed in the predetermined information processing task, or an amount of time required for the predetermined information processing task to be performed, wherein the progress degree display image includes an indicator located between the first position and the second position and representing a progress degree corresponding to a position between the first position and the second position, and wherein a number of virtual characters are displayed in accordance with, at least, the amount of data to be processed.

16. A non-transitory computer-readable storage medium comprising information processing program instructions that causes a computer of an information processing apparatus, including a display device having at least one screen, to perform:

executing a predetermined information processing task;

generating a virtual scene space from which a virtual camera produces a progress degree display image, the progress degree display image including virtual characters and indicating a degree of progress to which the predetermined information processing task has been executed;

displaying, on the at least one screen, either an image of an entirety of the virtual scene space or an image of a partial region of the virtual scene space, the displayed partial region being indicative of a most recent degree of progress of the predetermined information processing task; and changing a position of a viewpoint produced by the virtual camera within the virtual scene space so as to sequentially shift the displayed partial region from a first position representing a start position of the predetermined information processing task toward a second position representing a completion position of the predetermined information processing task, the displayed partial region being used as a display range within the virtual scene space such that at least the most recent degree of progress is constantly displayed on the at least one screen in accordance with a change in degree of progress of a performance of the predetermined information processing task, wherein in the displaying, the image of the entirety of the virtual scene space is displayed on the screen at least in some period, and wherein a length of spatial separation between the first position and the second position in the virtual scene space is set corresponding to an amount of information or an amount of data to be processed in the predetermined information processing task, or an amount of time required for the predetermined information processing task to be performed, wherein the progress degree display image includes an indicator located between the first position and the second position and representing a progress degree corresponding to a position between the first position and the second position, and wherein a number of virtual characters are displayed in accordance with, at least, the amount of data to be processed.

17. A method for displaying the progress of a task executed by an information processing apparatus, comprising:

executing a predetermined information processing task;

generating a virtual scene space from which a virtual camera produces a progress degree display image, the progress degree display image including virtual characters and indicating a degree of progress to which the predetermined information processing task has been executed;

displaying, on a display having at least one screen, either an image of an entirety of the virtual scene space or an image of a partial region of the virtual scene space, the displayed partial region being indicative of a most recent degree of progress of the predetermined information processing task; and changing a position of a viewpoint produced by the virtual camera within the virtual scene space so as to sequentially shift the displayed partial region from a first position representing a start position of the predetermined information processing task toward a second position representing a completion position of the predetermined information processing task, the displayed partial region being used as a display range within the virtual scene space such that at least the most recent degree of progress is constantly displayed on the at least one screen in accordance with a change in degree of progress of a performance of the predetermined information processing task, wherein in the displaying, the image of the entirety of the virtual scene space is displayed on the screen at least in some period, and wherein a length of spatial separation between the first position and the second position in the virtual scene space is set corresponding to an amount of information or an amount of data to be processed in the predetermined information processing task, or an amount of time required for the predetermined information processing task to be performed, wherein the progress degree display image includes an indicator located between the first position and the second position and representing a progress degree corresponding to a position between the first position and the second position, and wherein a number of virtual characters are displayed in accordance with, at least, the amount of data to be processed.

* * * * *